No. 656,476. Patented Aug. 21, 1900.
A. F. ROCKWELL.
CYCLOMETER ATTACHMENT.
(Application filed Apr. 26, 1899.)
(No Model.)
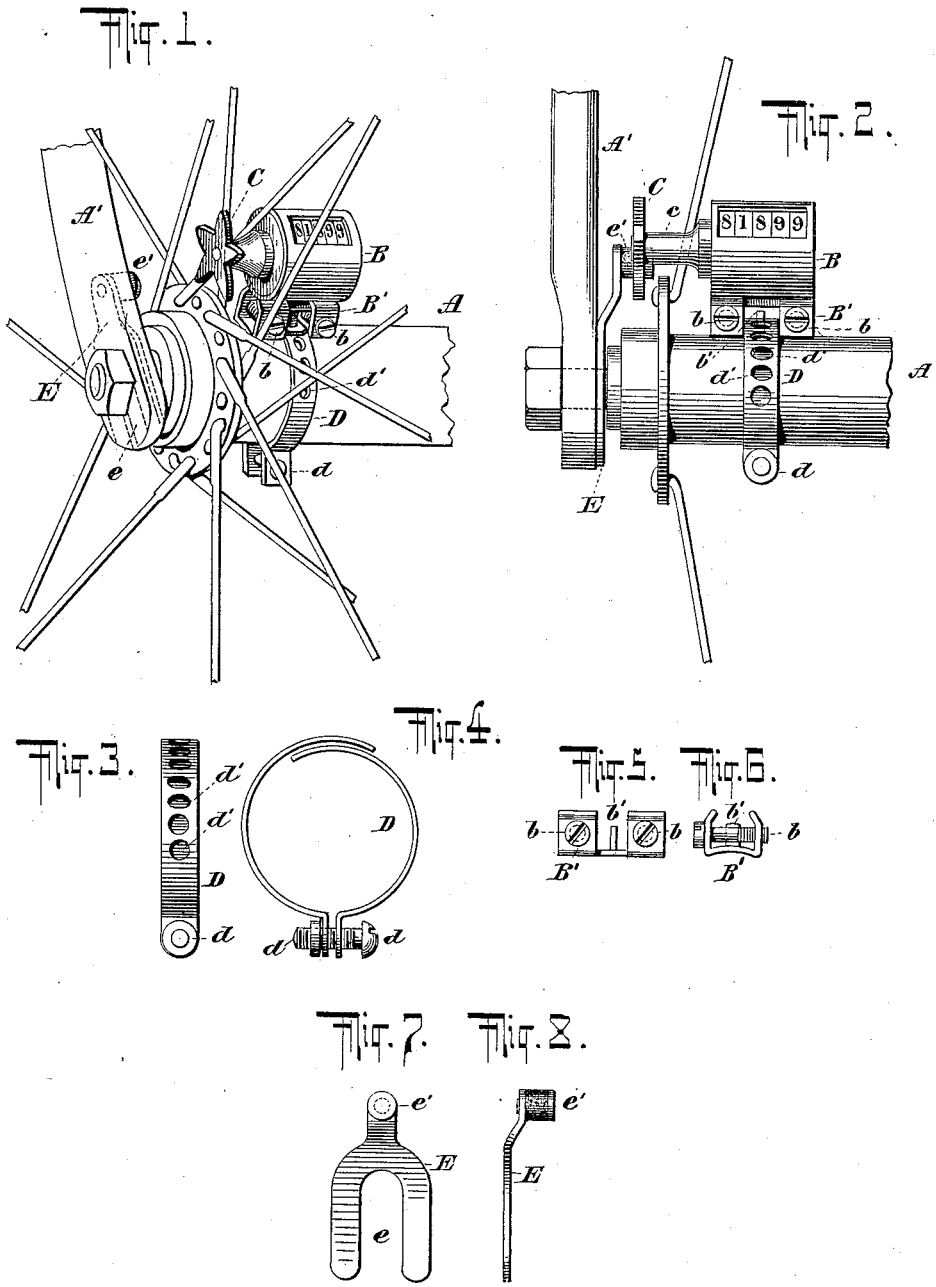

UNITED STATES PATENT OFFICE.

ALBERT FENIMORE ROCKWELL, OF BRISTOL, CONNECTICUT, ASSIGNOR TO THE NEW DEPARTURE BELL COMPANY, OF SAME PLACE.

CYCLOMETER ATTACHMENT.

SPECIFICATION forming part of Letters Patent No. 656,476, dated August 21, 1900.

Application filed April 26, 1899. Serial No. 714,494. (No model.)

*To all whom it may concern:*

Be it known that I, ALBERT FENIMORE ROCKWELL, of Bristol, in the county of Hartford and State of Connecticut, have invented certain new and useful Improvements in Cyclometer Attachments; and I do hereby declare the following to be a full, clear, and exact description of the invention, such as will enable others skilled in the art to which it appertains to make and use the same.

Heretofore cyclometers, which are very desirable and useful articles for bicyclists, have been placed upon the axle outside of the frame of the bicycle, with a trip affixed to the spoke of the wheel, so that upon rotation of the wheel the trip engaged at each rotation a star-wheel projecting from the cyclometer and caused it to be actuated in the familiar way.

As bicycles have come into more common use and are used for a greater number of purposes, it is found necessary to sometimes pile them together or set them up in places where they are liable to be blown or knocked down, to the great hazard of the cyclometer affixed to the axle outside the frame. The invention herein set forth provides means for the attachment of a cyclometer to the hub inside the spokes, so that danger of injury to the cyclometer is to a very great extent removed.

Reference is had to the annexed drawings and to the letters marked thereon, forming a part of this specification, the same letters designating the same parts or features wherever they occur.

Referring to the drawings, Figure 1 is a view in perspective of a cyclometer attached to the front wheel of a bicycle in accordance with the requirements of this invention. In this case the wheel and cyclometer are looked at from the front and right side, the trip being shown in dotted lines, as though the fork were transparent. Fig. 2 is a direct front view of the front wheel and cyclometer attached. Fig. 3 is a front view of the hub-encircling band. Fig. 4 is a side view of the same. Fig. 5 is a front view, and Fig. 6 a side view, of the clamp. Fig. 7 is an end view, and Fig. 8 a side view, of the trip.

B represents the cyclometer, which is affixed to the hub by means of the clamp B' and the band D.

C is a star-wheel which is affixed to an axle extending out through the spokes. This is protected by a collar $c$, within which the axle rotates. There are ribs on the lower side of the cyclometer. A clamp B' is arranged to engage these ribs in the manner shown in the drawings. The clamp B' consists of a flexible piece of steel in two parts, with a piece $b'$ struck up from the bottom between the two clamping ends. These clamping ends engage the ribs on the lower part of the cyclometer and are firmly clamped thereto by means of the screws $b\ b$. The band D consists of two parts, with one orifice in one part and several orifices in the other part $d'\ d'$. The projecting ends are connected by a screw $d$. The several orifices are constructed for the purpose of permitting an adjustment of the band to hubs of different diameters. The band is applied to the clamp, the struck-up piece $b'$ entering into the orifices of the band, and then the screw $d$ draws the ends of the band together, fastening the band, and consequently the cyclometer, closely and firmly to the hub. On the axle, between the spokes and the frame, is screwed firmly the fork E, upon the upper end of which is a trip E', so arranged as to engage the star-wheel C.

Upon a propulsion of the bicycle the hub will be caused to revolve, and with it the cyclometer, and upon each revolution the star-wheel C will be caused to come into contact with the trip E', and thus the star-wheel be caused to rotate through one point, and consequently the cyclometer will be actuated. Thus the cyclometer is actuated to indicate the distance traveled by the wheel, but by a reverse action to that ordinarily attempted with cyclometers. Being placed in position where it is out of ordinary chance of contact with exterior objects it is to an almost-absolute degree protected from injury and harm.

This invention consists in the attachment of a cyclometer to the hub of a wheel within the spokes, where it is protected from accidental injury, means to so attach it to the hub, and means to effect its actuation by the contact of its star-wheel with the stationary trip upon the axle in the place of the ordinary construction where the cyclometer is attached to the axle and actuated by a trip upon the spoke of the wheel.

I claim as my invention the following-described features, substantially as hereinbefore specified, to wit:

1. The combination of a bicycle-wheel, a cyclometer actuated by a rotating shaft, said cyclometer being located within the spokes of the wheel upon the hub thereof and revolving therewith and thereupon, the actuating-shaft lengthened to project beyond the case of the cyclometer and between and outside of the spokes of the wheel, and means to actuate said shaft fixed to a non-moving part of the bicycle and connecting with a revolving element at the end of the shaft, substantially as described.

2. A cyclometer with projecting axle and collar, having ribs upon its base, in combination with a double-ended clamp to engage said ribs, a band connecting said clamp firmly to the hub of the bicycle and a trip attached to a non-moving part of the bicycle to engage the star-wheel upon the extremity of said collar, substantially as described.

Signed by me at Bristol, Connecticut, this 17th day of April, 1899.

ALBERT FENIMORE ROCKWELL.

In presence of—
 LAURA B. PENFIELD,
 ALICE E. BROWN.